United States Patent [19]
Prasad

[11] Patent Number: 5,625,704
[45] Date of Patent: Apr. 29, 1997

[54] SPEAKER RECOGNITION USING SPATIOTEMPORAL CUES

[75] Inventor: K. Venkatesh Prasad, Cupertino, Calif.

[73] Assignees: Ricoh Corporation, Menlo Park, Calif.; Ricoh Company Ltd., Tokyo, Japan

[21] Appl. No.: 336,974

[22] Filed: Nov. 10, 1994

[51] Int. Cl.⁶ .................................................. G06K 9/00
[52] U.S. Cl. ............................ 382/118; 382/115; 382/170
[58] Field of Search ........................... 382/2, 1, 118, 382/115, 170, 253, 288

[56] References Cited

U.S. PATENT DOCUMENTS

| | | | |
|---|---|---|---|
| 4,841,575 | 6/1989 | Welsh et al. | 382/2 |
| 4,975,960 | 12/1990 | Petajan | 382/2 |
| 4,975,969 | 12/1990 | Tal | 382/2 |
| 4,975,978 | 12/1990 | Ando et al. | 382/2 |
| 5,136,659 | 8/1992 | Kaneko et al. | 382/2 |

OTHER PUBLICATIONS

–Ashok Samal et al., "Automatic Recognition and Analysis of Human Faces and Facial Expressions: A Survey," Pattern Recognition, vol. 25, No. 1, pp. 65–77 (1992).

–Harry McGurk et al., "Hearing Lips and Seeing Voices," Nature, vol. 264, pp. 746–748 (Dec. 23/30, 1976).

Primary Examiner—Jose L. Couso
Assistant Examiner—Matthew C. Bella
Attorney, Agent, or Firm—Blakely, Sokoloff, Taylor & Zafman

[57] ABSTRACT

A speaker recognition method uses visual image representations of mouth movements associated with the generation of an acoustic utterance by a speaker that is the person to be recognized. No acoustic data is used and normal ambient lighting conditions are used. The method generates a spatiotemporal gray-level function representative of the spatiotemporal inner month area confined between the lips during the utterance from which a cue-block is generated that isolates the essential information from which a feature vector for recognition is generated. The feature vector includes utterance duration, maximum lip-to-lip separation, and location in time, or speed of lip movement opening, speed of lip movement closure, and a spatiotemporal area measure representative of the area enclosed between the lips during the utterance and representative of the frontal area of the oral cavity during the utterance. Experimental data shows distinct clustering in feature space for different speakers.

28 Claims, 19 Drawing Sheets

FIG_1

$$g_3(x,y) \triangleq \begin{bmatrix} 1 & 4 & 1 \\ 4 & 12 & 4 \\ 1 & 4 & 1 \end{bmatrix}$$
x →
FIG_3A
$$g_3(x,y) \triangleq \begin{bmatrix} 1 & 2 & 3 & 2 & 1 \\ 2 & 7 & 11 & 7 & 2 \\ 3 & 11 & 17 & 11 & 3 \\ 2 & 7 & 11 & 7 & 2 \\ 1 & 2 & 3 & 2 & 1 \end{bmatrix}$$
x →
FIG_3B
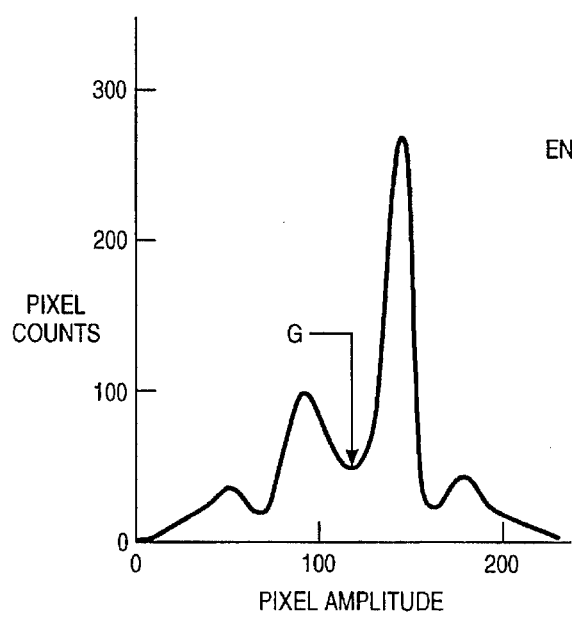
FIG_4
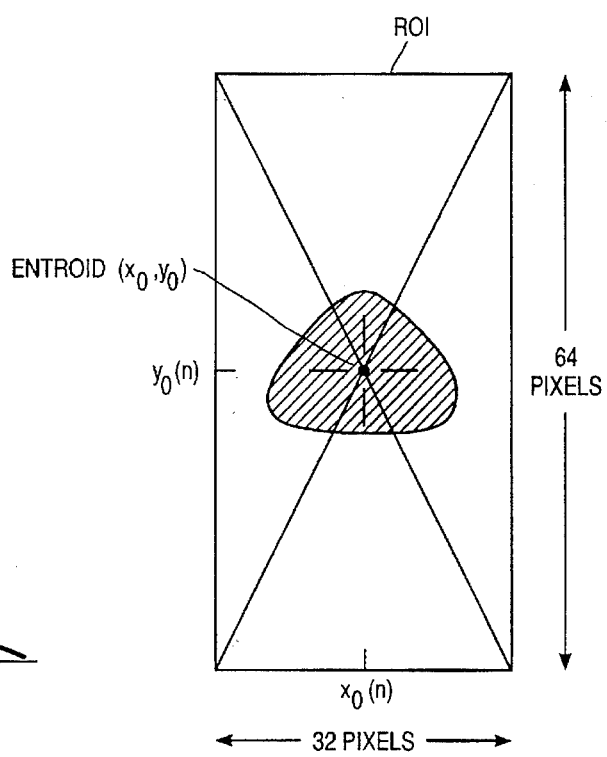
FIG_5

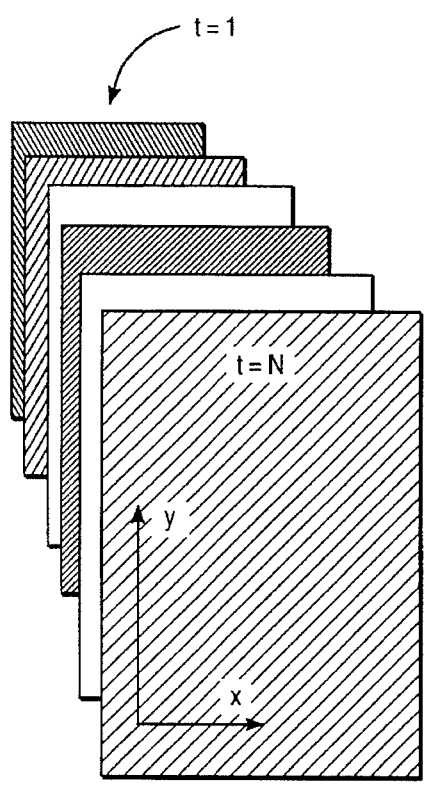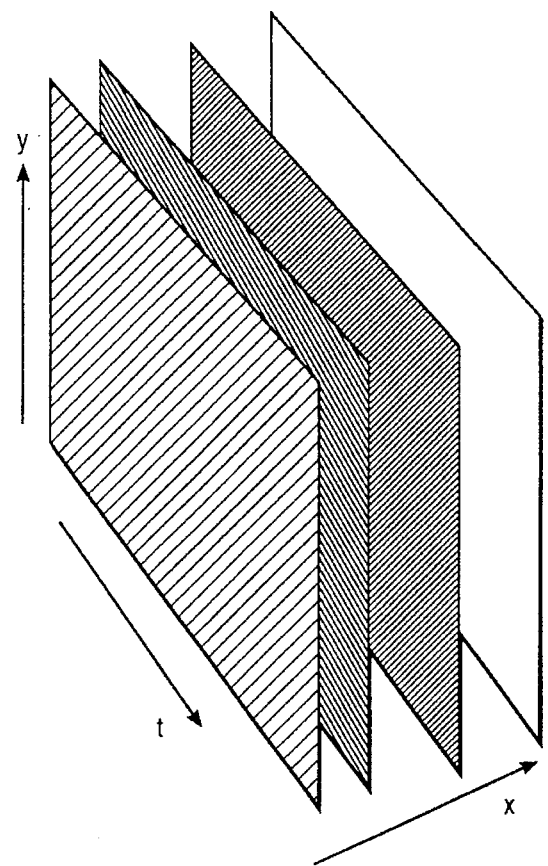
FIG_6A   FIG_6B

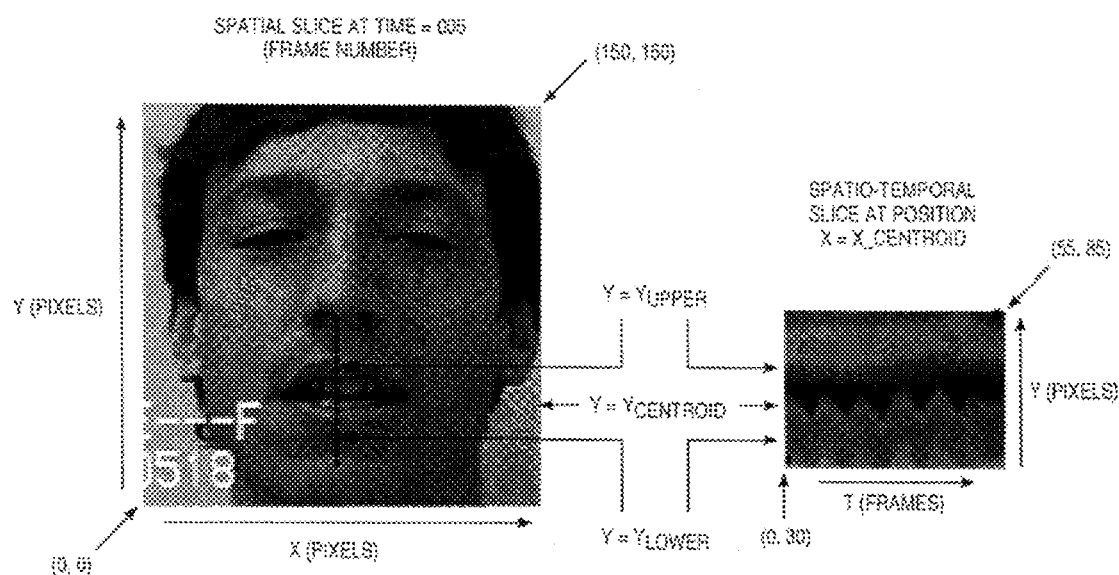
FIG_7A    FIG_7B

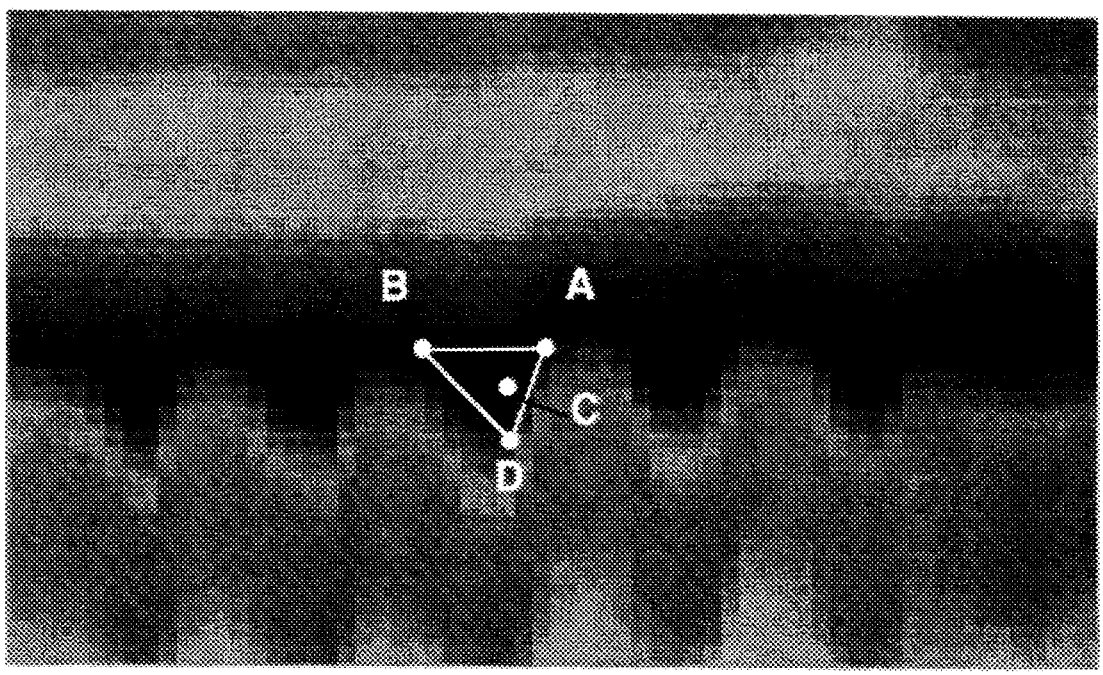
FIG_ X

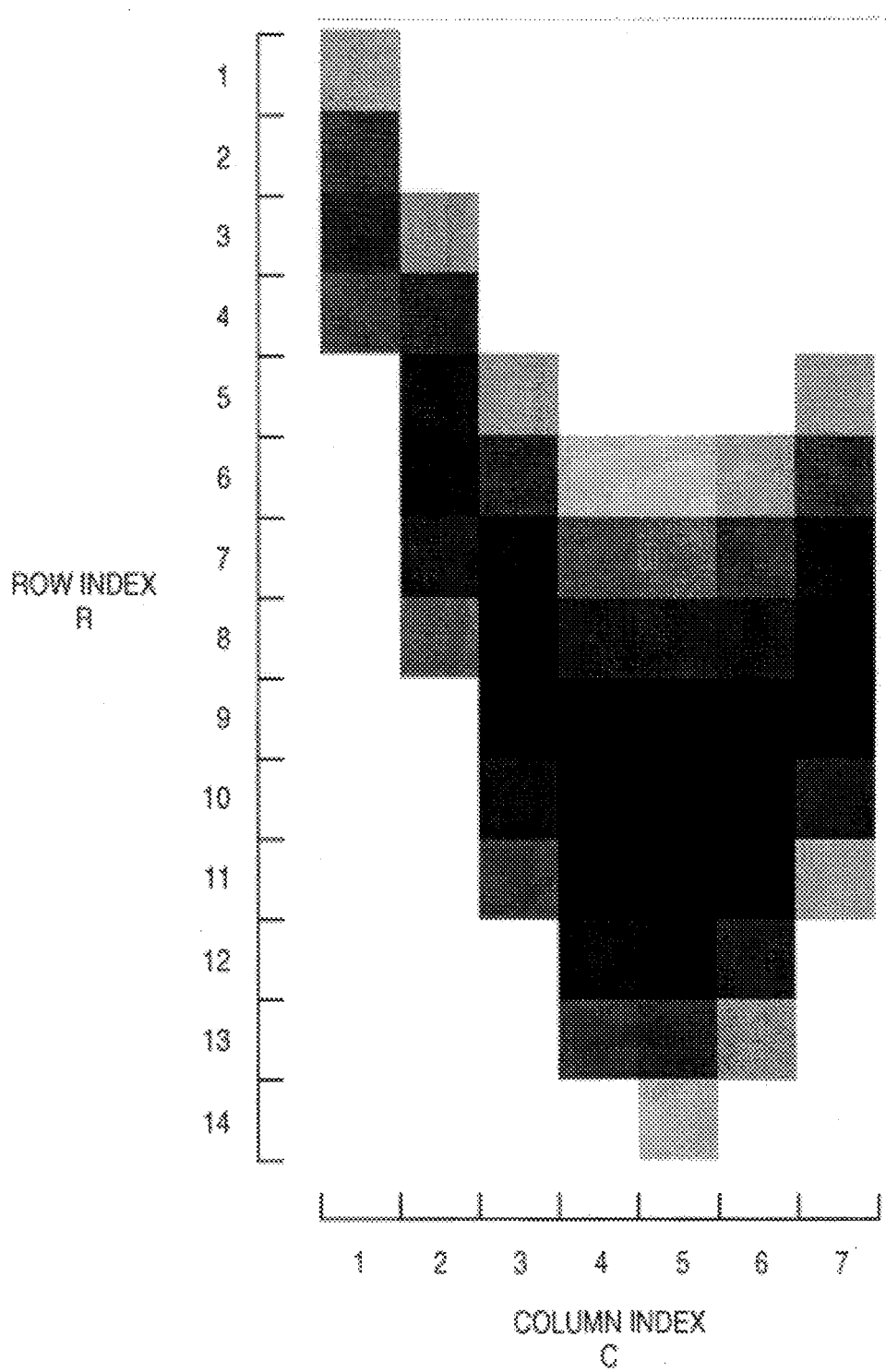
FIG_9

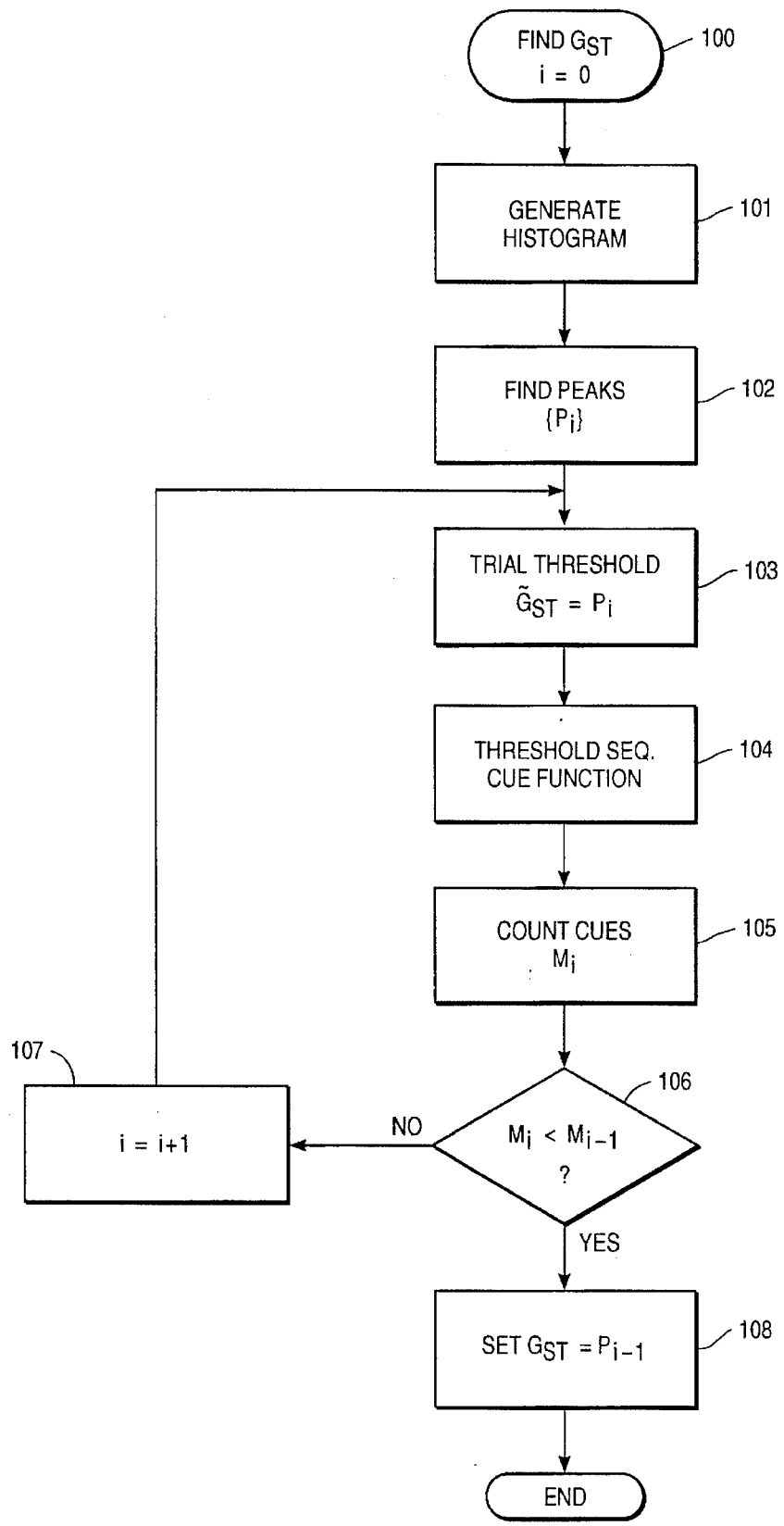
FIG_10

| PEAK INDEX i | GRAY LEVEL | CUE COUNT $M_i$ |
|---|---|---|
| 1 | 19 | 0 |
| 2 | 23 | 2 |
| 3 | 26 | 5 |
| 4 | 31 | 5 |
| 5 | 34 | 5 |
| 6 | 37 | 5 |
| 7 | 41 | 6 |
| 8 | 44 | 6 |
| 9 | 49 | 6 |
| 10 | 53 | 6 |
| 11 | 58 | 1 |

FIG_12

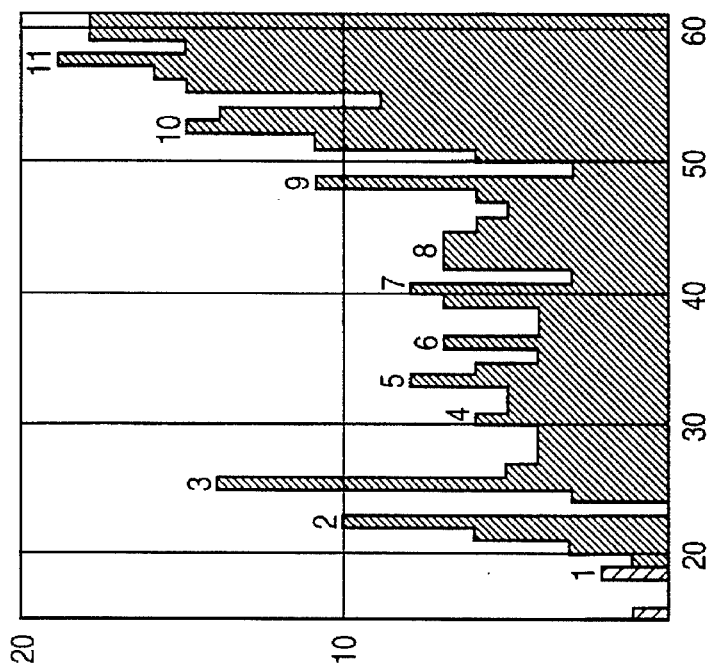
FIG_13B
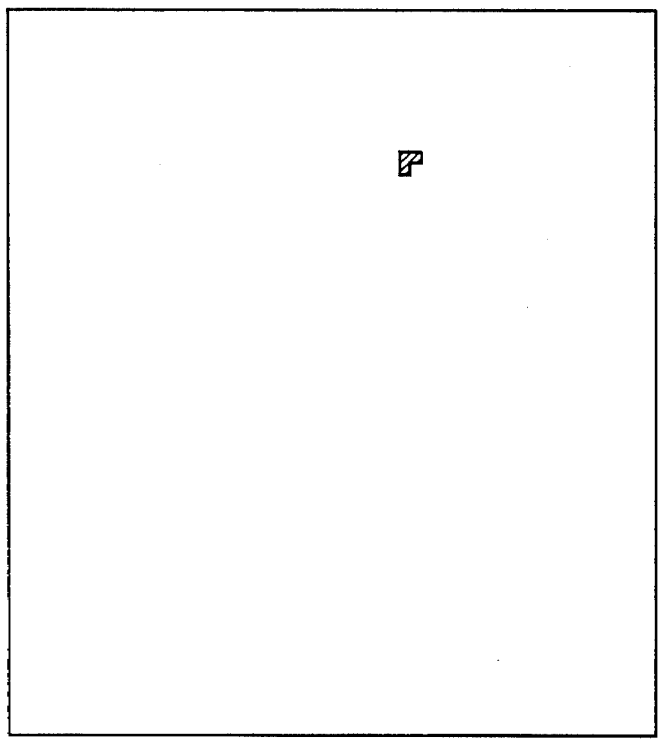
FIG_13A

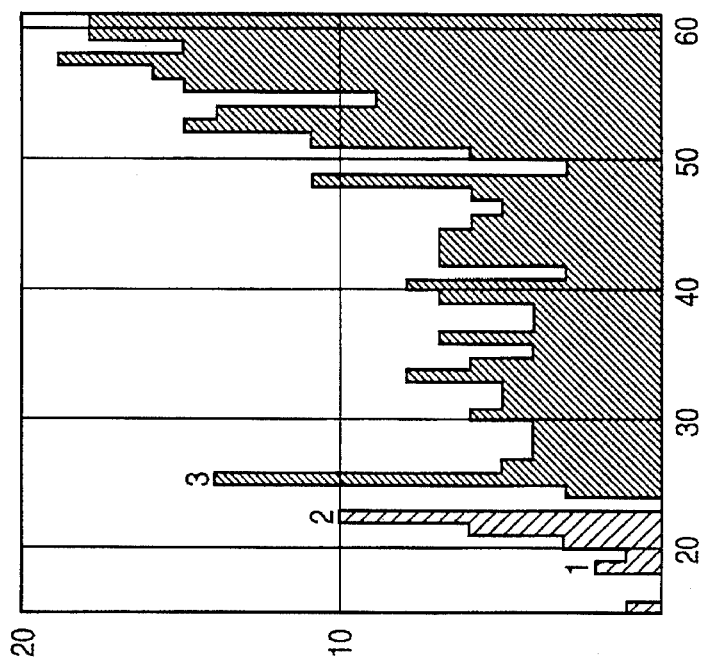
FIG_14B
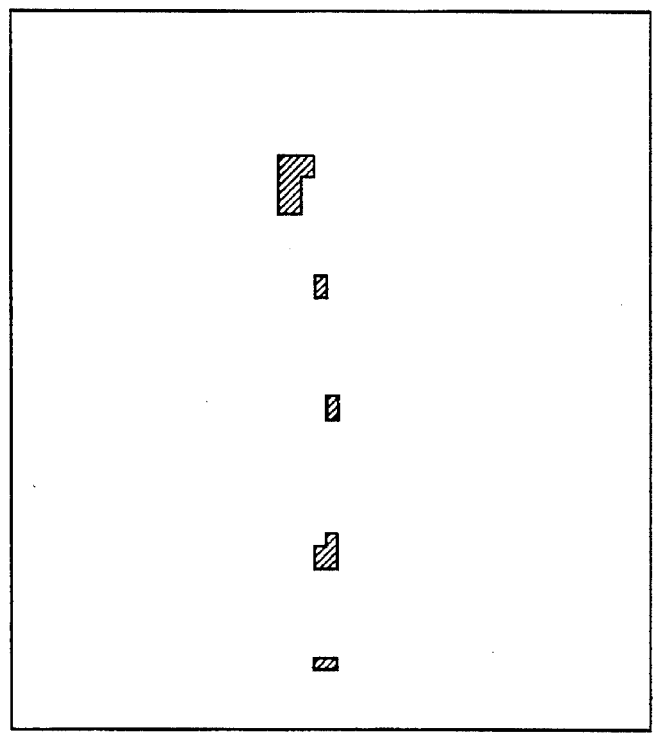
FIG_14A

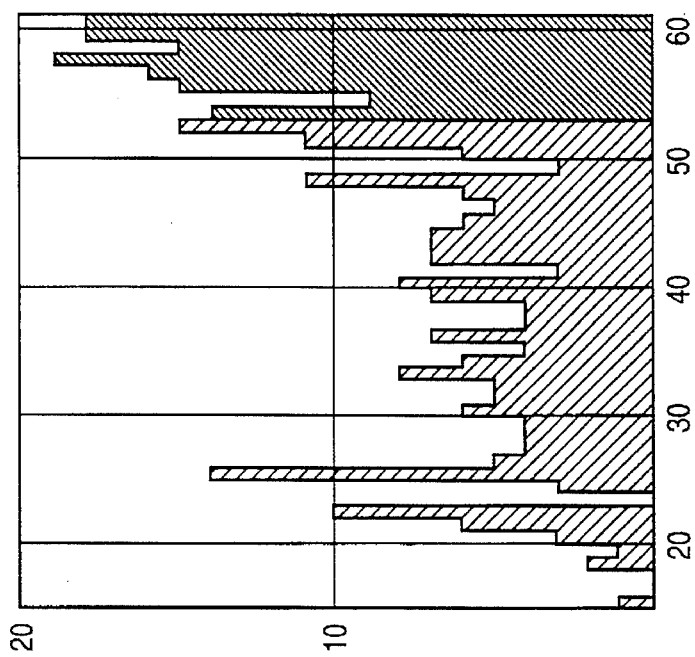
FIG_15B
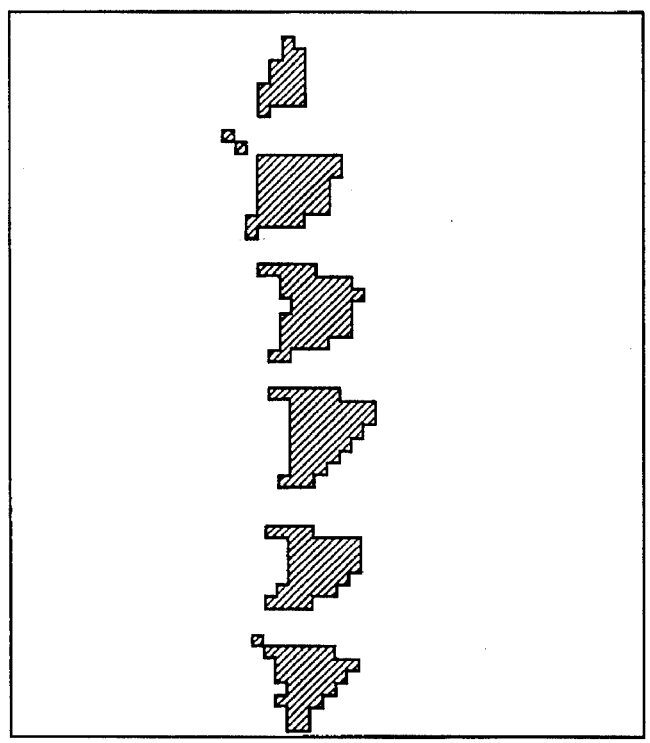
FIG_15A

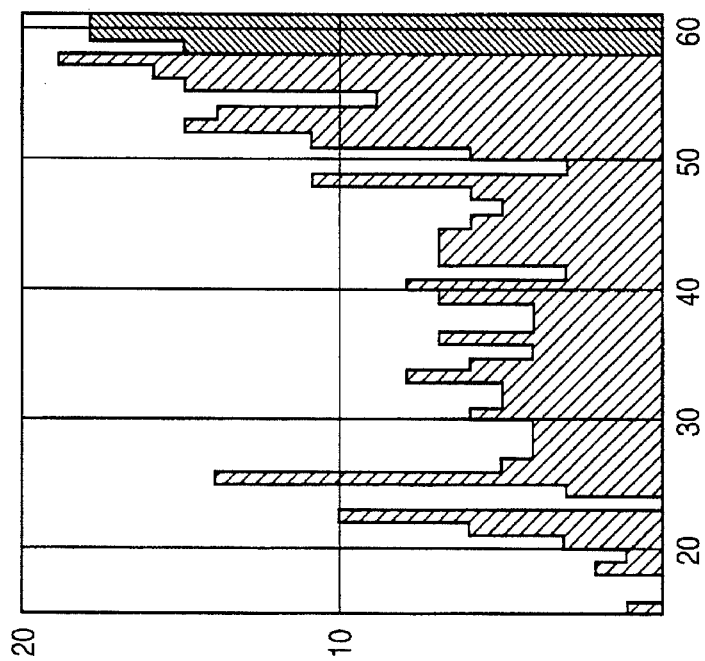
FIG_16B
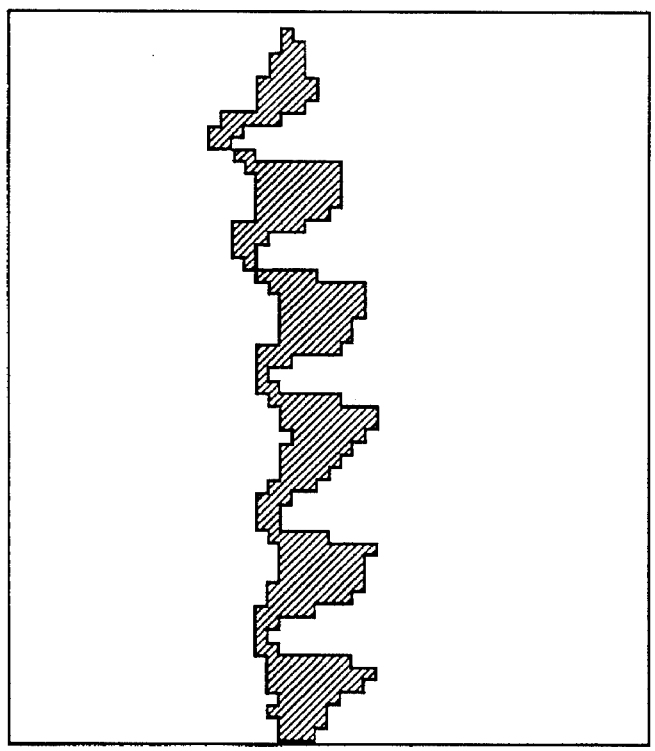
FIG_16A

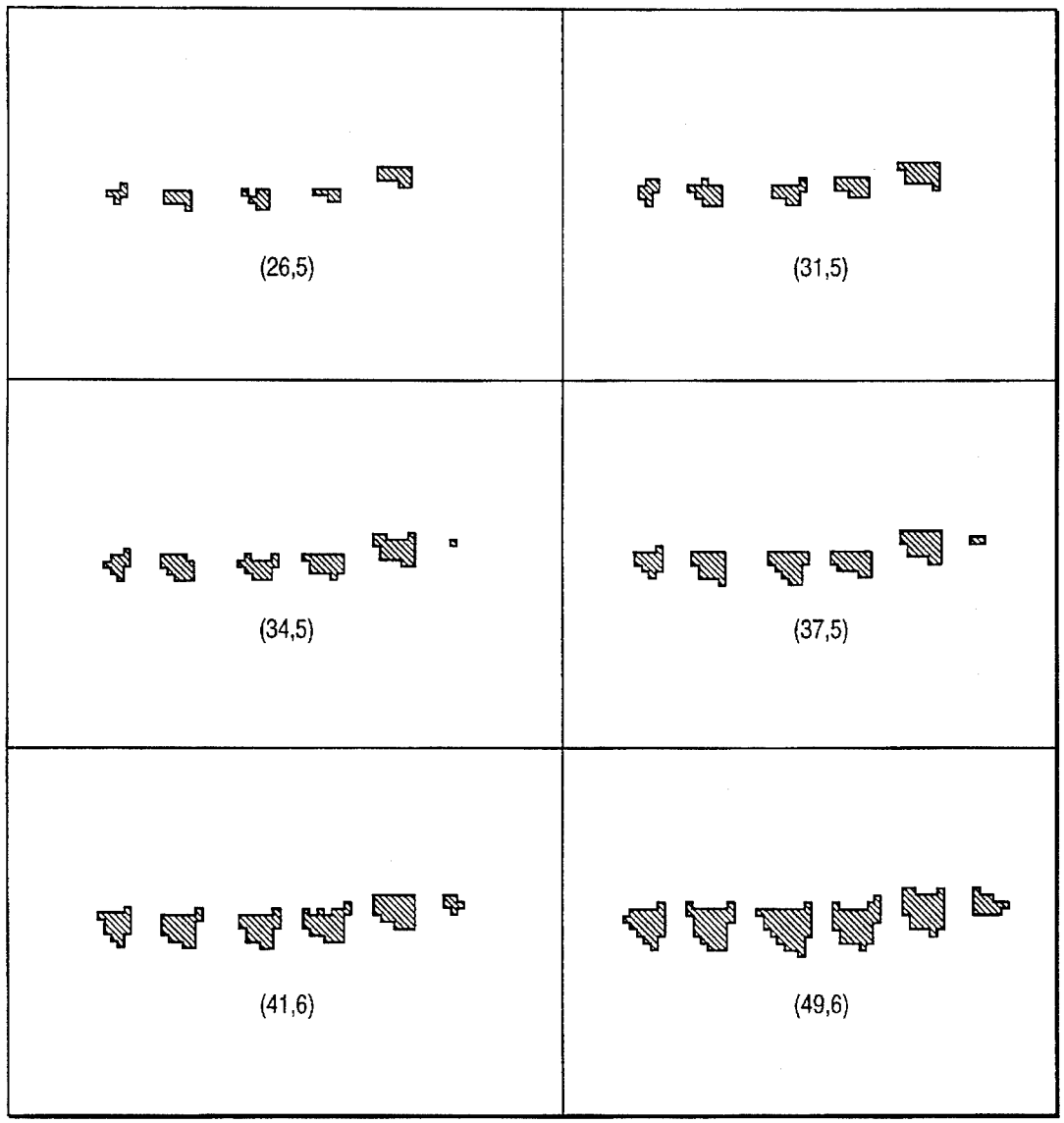
FIG_17
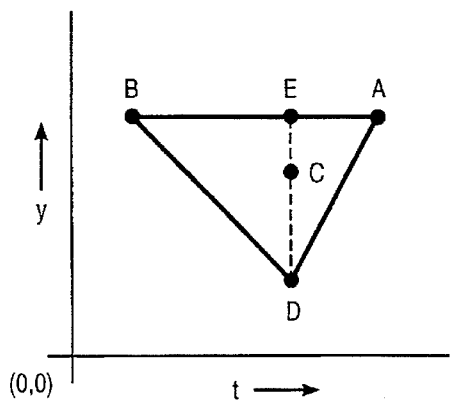
FIG_18A
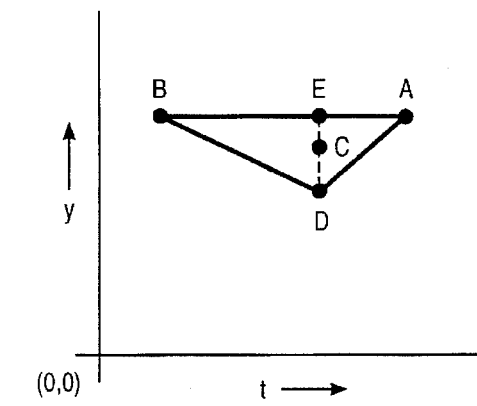
FIG_18B

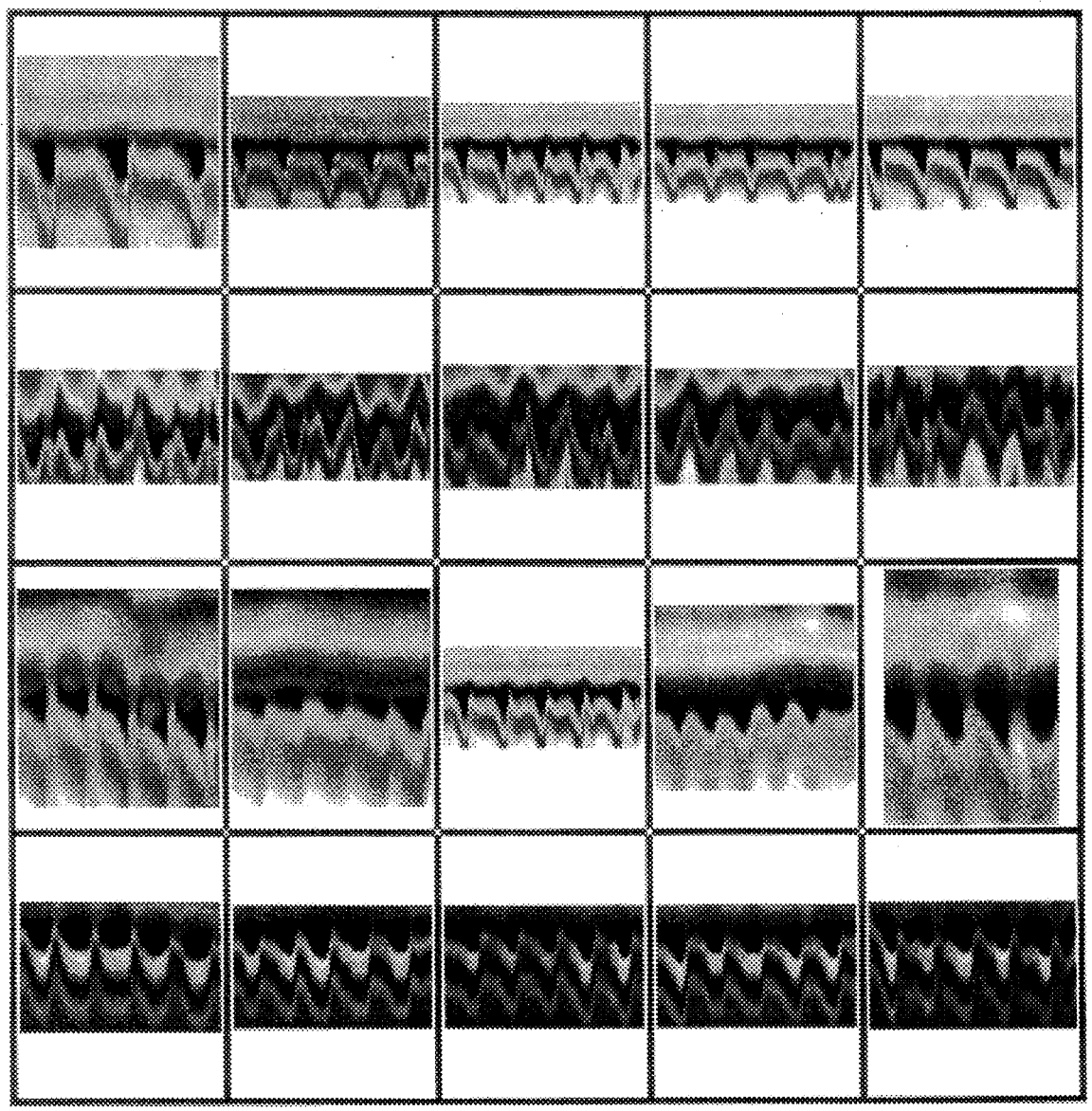
FIG_19

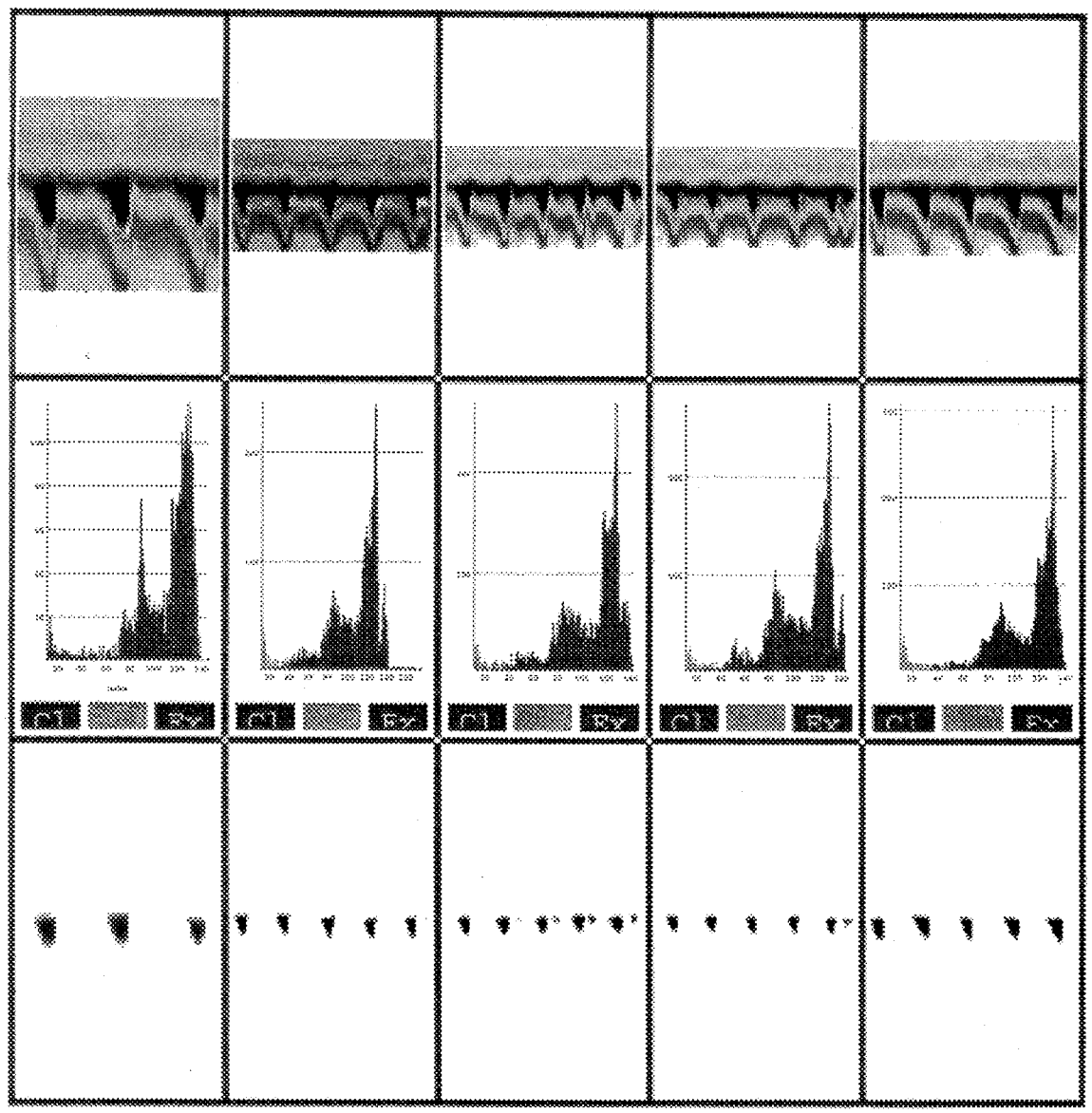
speaker ds; utterances L-R: /ba/, /da/, /fa/, /la/, /ma/.
FIG_20

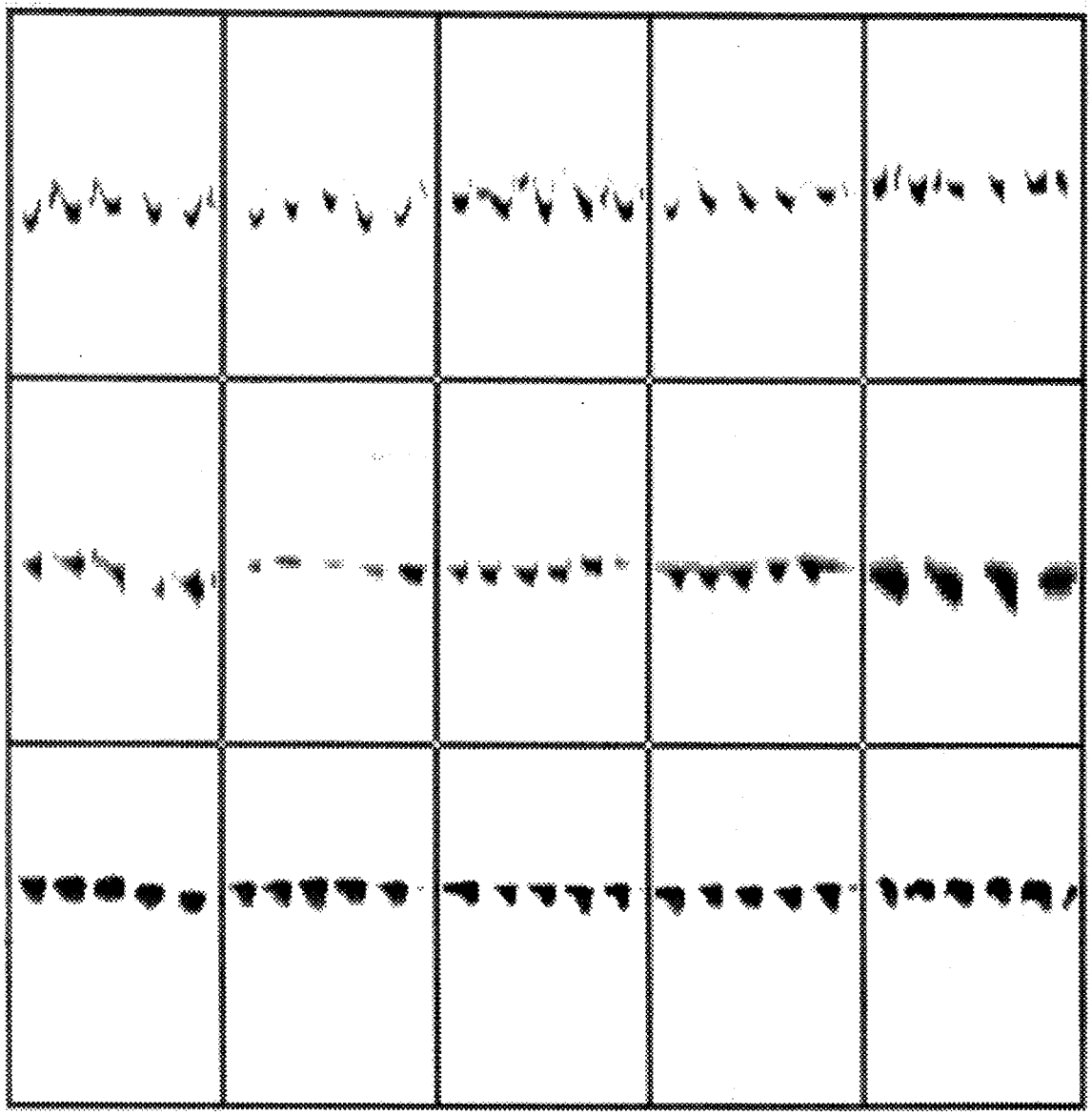
FIG_21

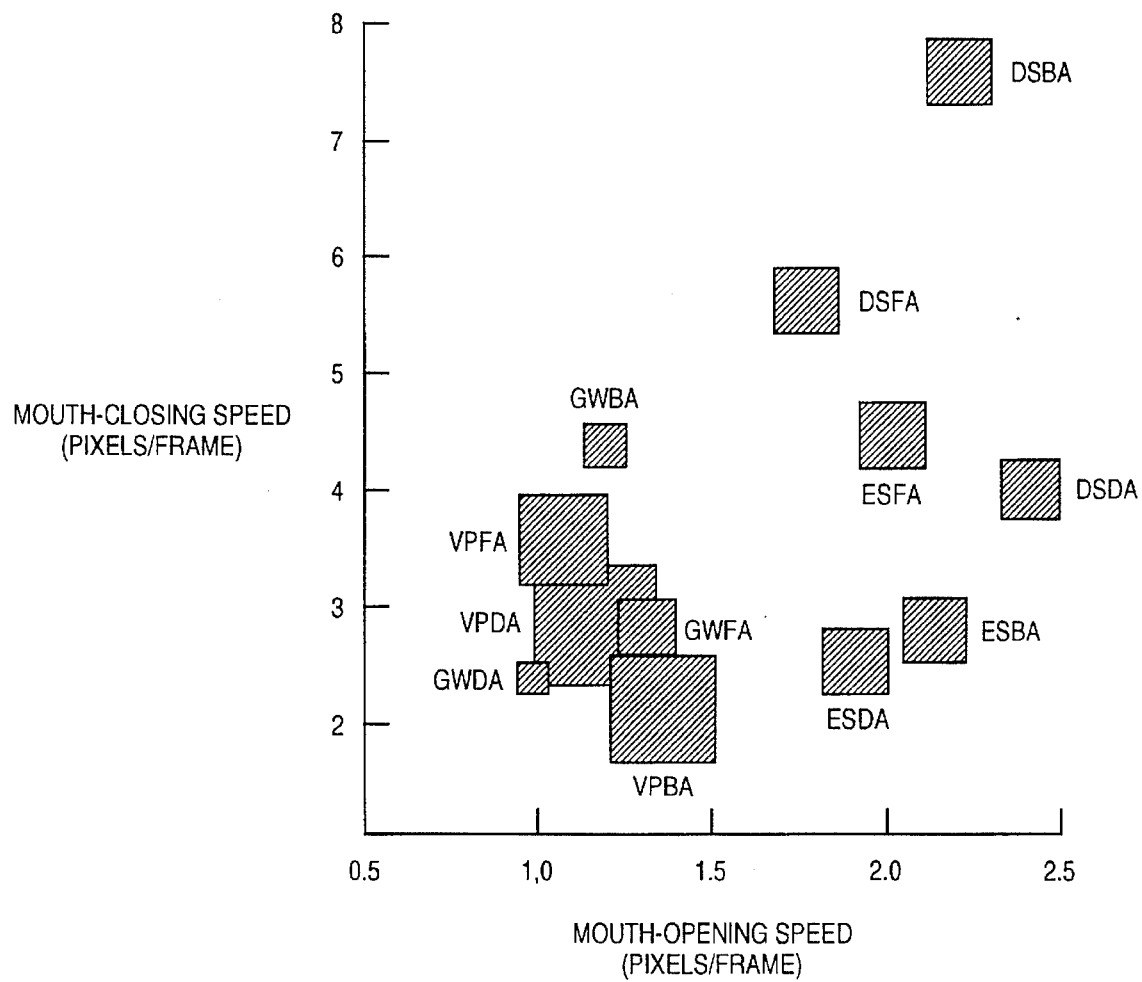
FIG_22

5,625,704

SPEAKER RECOGNITION USING SPATIOTEMPORAL CUES

FIELD OF THE INVENTION

The present invention relates to a method and apparatus for identifying individuals from visual observation and to security systems employing visual identification methods. More specifically, the invention relates to generating recognition cues from dynamic visual observations of a speaker's face especially lip movements and the frontal view of the oral (mouth) cavity that may be used with other augmenting recognition observations.

BACKGROUND OF THE INVENTION

Traditionally, visual-information based face recognition methods have relied on using cues derived from static spatial relationships of facial features such as eyes, ears, nose, and mouth taken from one dimensional profiles or two-dimensional images. An exhaustive list of spatial features for face recognition can be found in Ashok Samal et al., "Automatic Recognition and Analysis of Faces and Facial Expressions: A Survey," Pattern Recognition, Vol., 25, No. 1, pp. 65–77 (1992). The input data is usually obtained from a single "snapshot."

Another example of a facial recognition system is described by Peter Tal, U.S. Pat. No. 4,975,969, for a "Method and Apparatus for Uniquely Identifying Individuals by Particular Physical Characteristics and Security System Utilizing the Same," in which static distances between identifiable points on human faces can be used to identify an individual.

FIG. 1 shows the key facial parameters used by Tal that include: the distance between eye retina centers (LER); the distance between the left eye retina center and the mouth center (LEM); the distance between both retina centers and the nose bottom (LEN and REN); and the distance between the mouth center and the nose bottom (DMN). In addition various ratios of these static distance features are formed for scale normalization.

The attraction of using a single still-image, as opposed to using multiple still images, or a video recording, is at least two-fold:

(1) a single still image is less demanding of memory storage requirements; and (2) human observers can recognize faces when presented with a single snapshot with little evidence that recognition is improved by using a video recording of the speaker.

The prior art, using strictly static facial features, performs facial recognition by "seeing." The present invention uses a space and time (spatiotemporal) representations of dynamic speech related facial features for identification of a speaker. The method only uses visible observations (no acoustic data). This is face recognition by seeing and visual hearing.

SUMMARY AND OBJECTS OF THE INVENTION

The speaker recognition method and apparatus uses mouth movements associated with an acoustic utterance generation without any accompanying acoustic signal, to generate a temporal visual feature vector that produces distinct clustering, for different speeches, in the feature vector space. The feature space includes the following components: mouth opening speed, mouth closing speed, and a spatiotemporal area parameter representing the mouth opening (lip separation or the frontal area of the oral (mouth) cavity) and duration of opening for each utterance.

It is an object to provide a method for providing speaker recognition by observing the feature space components of a speaker.

It is a further object to augment existing facial recognition systems by including these feature space components.

Another object is to provide dynamic facial recognition features that are compact and require minimal memory space.

Another object is to provide a recognition system that is suitable for normal office ambient lighting conditions.

BRIEF DESCRIPTION OF THE DRAWINGS

The file of this patent application contains at least one drawing executed in color. Copies of the patent with color drawing(s) will be provided by the Patent and Trademark Office upon request and payment of the necessary fee.

The present invention is illustrated by way of example and not limited to the figures or the accompanying drawings, in which like references indicate similar elements and in which:

FIG. 3(a) shows the values of sampled Gaussian convolution kernel, $G_3$.

FIG. 3(b) shows the values of sampled Gaussian convolution kernel, $G_5$.

FIG. 4 is a histogram of $\{u_s^f\}$ gray-scale values with masking threshold indicated.

FIG. 5 shows the region of interest (ROI).

FIG. 6(a) shows the visual spatiotemporal (ST) volume used for feature extraction.

FIG. 6(b) shows a series of slices through the spatiotemporal (ST) volume shown in FIG. 6(a)

FIG. 7(a) shows the relationship between a speaker's mouth and a slice through the ST volume in an image with a dotted line through the mouth region corresponding to a set of pixels.

FIG. 7(b) shows a gray-scale sequential cure function that results by taking a set of pixel values similar to those of FIG. 7(a) for a sequential set of frames along the t-access.

FIG. 8 shows a selected slice through the visual spatiotemporal (ST) volume.

FIG. 9 defines a cue in the visual spatiotemporal (ST) volume slice.

FIG. 10 is a flow chart for finding threshold, $G_{ST}$.

FIG. 12 is a table of peaks found in the histogram of FIG. 11(b).

FIG. 13(a) is the sequential cue function of FIG. 11(a) showing remnants when thresholded at $G_{ST}=19$.

FIG. 13(b) shows peaks $P_1$-$P_{11}$ of the histogram of FIG. 11(b) when thresholded at $G_{ST}=19$.

FIG. 14(a) shows the remnants of the sequential cue function of FIG. 11(a) when thresholded at $G_{ST}=23$.

FIG. 14(b) shows the histogram of FIG. 11(b) and threshold level, $G_{ST}=23$.

FIG. 15(a) shows the remnants of the sequential cue function of FIG. 11(a) when thresholded at $G_{ST}=53$.

FIG. 15(b) shows the histogram of FIG. 11(b) and threshold level, $G_{ST}=53$.

FIG. 16(a) shows the remnant of the sequential cue function of FIG. 11(a) when thresholded at $G_{ST}=58$.

FIG. 16(b) shows the histogram of FIG. 11(b) and threshold level, $G_{ST}=53$.

FIG. 17 shows a series of sequential cue function remnants due to six different threshold levels.

FIG. 18 shows the effect of camera perspective on the cue when speaking and utterance at a first distance.

FIG. 18(b) shows the cue of the same speaker as in FIG. 18(a) but at a greater distance.

FIG. 19 shows visual spatiotemporal (ST) slices for four different speakers and five different utterances.

FIG. 20 shows the relationships between the visual ST slices, gray-level amplitude histograms, and cue-blocks.

FIG. 21 shows a set of cue-blocks from three different speakers.

FIG. 22 is a scatter diagram showing the clustering in feature space for different speakers.

DETAILED DESCRIPTION

Figure 1:
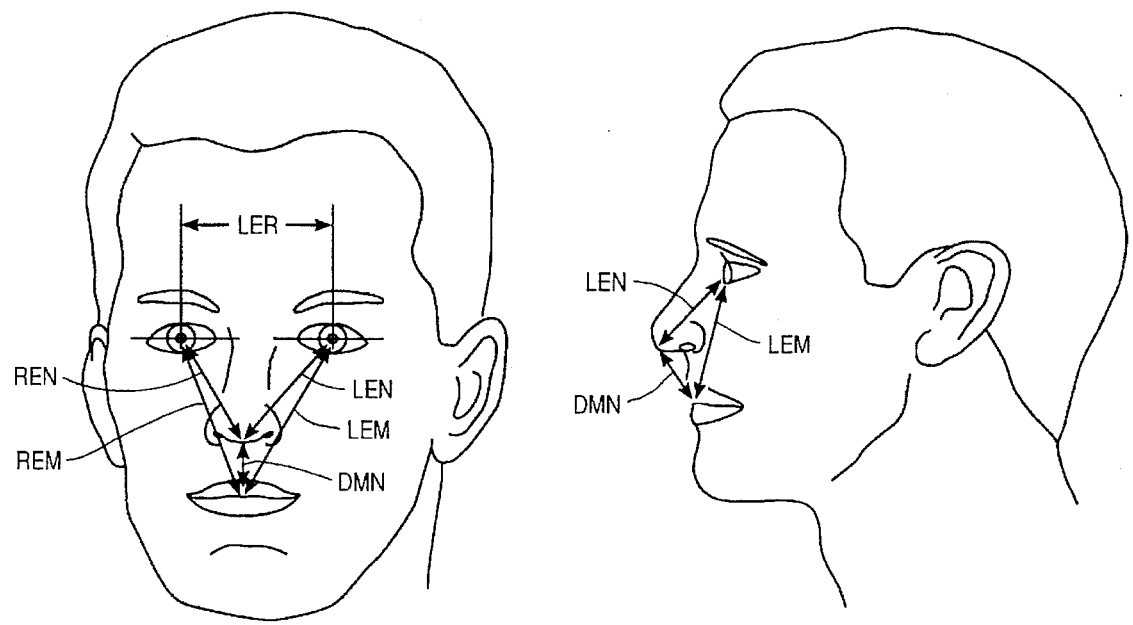
FIG. 1 shows a set of static facial features used in a prior art system.
Figure 2:
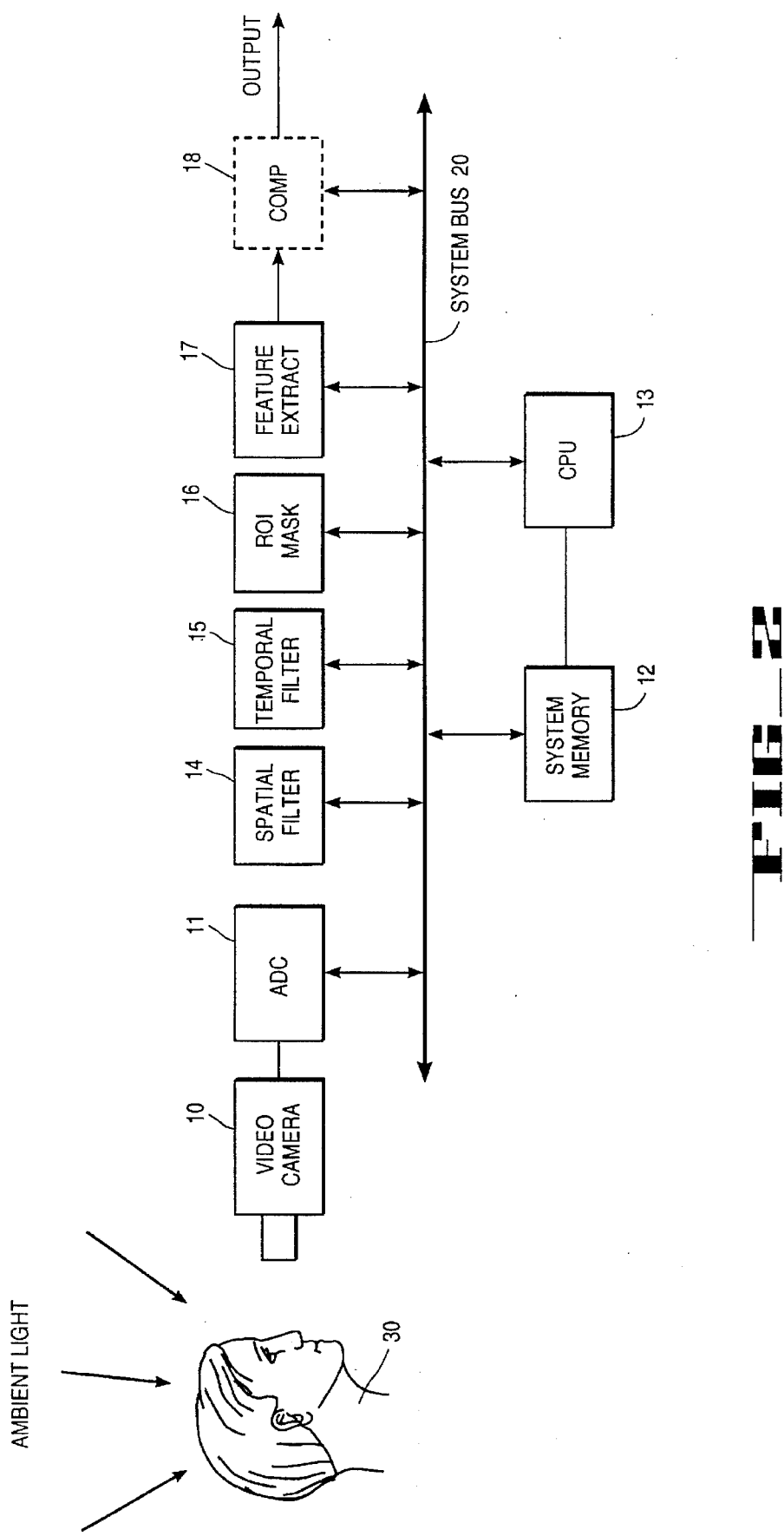
FIG. 2 is a spatiotemporal recognition system block diagram.

FIG. 2 is a block diagram of a speaker recognition system using spatiotemporal cues that is organized around a system bus 20, central processor unit (CPU 13) and system memory 12. The human object 30 to be recognized may be illuminated by ordinary ambient light such as normally found in an office environment. The image is picked-up by video camera 10, which may be any standard NTSC camera and the output raster scanned image is fed to analog-to-digital converter (ADC) 11 that produces a sampled and quantized raster image (frame) that is stored in system memory 12. A sequence of raster scanned image frames are processed by video camera 10 and ADC 11 representing one or more utterances by object 30. Video camera 10 generates 30 frames per second. Each frame, when converted by ADC 11, becomes an array of 640×480 pixels, each pixel being an 8-bit number representing the image intensity (luminance or gray scale) at each of the points sampled by ADC 11. Because of the high degree of redundancy in the two interlaced fields of each frame from video camera 10, alternate fields are discarded.

The pixel frames stored in system memory 12 are pre-processed by spatial filter 14 and temporal filter 15. Spatial filter 14 performs two 2-dimensional filtering operations on each frame: a smoothing or low pass filtering operation for the reduction of spatial noise and an edge enhancement operation for sharpening image edges. Either filtering operation may be performed first or the combined smoothing and edge sharpening may be performed as a single filtering operation. A particular implementation used 3×3 and 5×5 pixel convolution kernels for the smoothing and the edge enhancement filters. The weights of the 3×3 pixel convolution kernel, $g_3(x,y)$, the 5×5 pixel convolution kernel, $g_5(x,y)$, are two-dimensional sampled gaussian functions with standard deviations of $\sigma_3=0.391$ and $\sigma_5=0.625$ respectively, as shown in FIGS. 3(a) and 3(b).

In one implementation, the spatial smoothing is performed by convolving each pixel frame using kernel $g_3(x,y)$ while the edge enhancement is performed by convolving each frame with a 5×5 kernel representing the difference between kernels, $(g_3(x,y)-g_5(x,y))$.

The spatially filtered images are also smoothed across three sequential frames, i.e., temporal smoothing using a low pass filter kernel, having relative weights $[w_1 w_2 w_3]=[0.7, 1.0, 0.7]$.

Because these filter operations are linear processes, they commute and hence may be performed in any order. Thus, if a particularly utterance generates a sequence of N pixel images, $\{u_s\}$, by speaker, s, where $$\{u_s\}=\{u_s(x,y,1), u_s(x,y,2), \ldots, u_s(x,y,N)\} \tag{1}$$

and (x,y) are the pixel coordinates, the spatiotemporal filtering operations result in a filtered sequence of images, $\{u_s^f\}$, where $$\{u_s^f\} = \{u_s^f(x,y,1) u_s^f(x,y,2), \ldots, u_s^f(x,y,N)\}, \text{ and} \tag{2}$$

$$u_s^f(x,y,n) = \frac{1}{3} \sum_{i=n-1}^{n+1} [w_i \cdot u_s(x,y,i)] * g_3(x,y) * (g_3(x,y) - g_5(x,y))$$

These are the filtered images stored in system memory 12.

Once the filtered images, $\{u_s^f\}$, are obtained, it is desirable to reduce the size of image being used in future processing, i.e., retain only the region of interest (ROI) that contains the spoken utterance information. The ROI is centered about the mouth opening.

Because the face, other than in the mouth region, tends to be stationary (fixed) relative to the mouth movement between frames, the difference between consecutive frames will be greatest in the mouth region (ROI). In other words the image difference sequence, $\{u_s^f\}$ is given by a sequence of frame differences, or $$\{u_s^f\}=\{u_s^f(1), u_s^f(2), \ldots, u_s^f(N-1)\} \tag{3}$$

where $$u_s^f(i)=|u_s^f(i+1)-u_s^f(i)| \tag{4}$$

and $u_s^f(i)$ is the $i^{th}$ filtered image $u_s^f(x,y,i)$.

The bright pixels in $u_s^f(i)$ represent the points of greatest change between succeeding frames, i.e., most likely those pixels associated with the mouth.

The ROI is defined by using a gray-scale threshold, G, to define a mask function, $m_s(x,y)$, that is either 1 or 0 so that $$\text{if } u_s^f(x=p,y=q) \geq G, \text{ then } m_s(p,q)=0, \tag{5}$$

otherwise $m_s(p,q)=1$.

The value of G depends on the gray-scale distribution of $\{u_s^f\}$. A histogram of pixel value count vs. pixel value of the ensemble $\{u_s^f\}$ is generated as a basis for selecting G. If the value of G is set to low, a large number of disparate ROIs may result. If set too high, only a small number of pixels will be identified with inter-frame changes. It has been found that a usable heuristic for setting the value G is to set it equal to the gray-level of the most central minima of the histogram. (Experience shows that the histograms are multi-modal.)

FIG. 4 is a typical histogram of $\{u_s^f\}$ gray levels using an 8-bit scale (level 0 corresponds to dark and 255 to bright). The arrow labeled G points to the heuristic threshold value.

FIG. 5 shows the mask $(m_s(p,q))$ that results from thresholding (shaded area) which is used to define the ROI, a 32×64 pixel rectangle region centered at the centroid of the threshold region. In general, the centroid is defined by the three spatiotemporal coordinates (x,y,t), but for each frame only the two spatial coordinates, (x,y), are needed. The 32×64 region of the corresponding stored image is cropped so that only the image pixels that are contained within the area defined by the ROI are stored. Each cropped image (ROI) is stored sequentially to form a spatiotemporal volume (STV) consisting of two spatial dimensions (x,y) and one time index (1<n<N) as shown in FIG. 6(a).

The collected ensemble of ROIs associated with a given utterance is then sliced through $x=x_0(n)$ for each of N ROIs to form a gray-scale image along the y-dimension as a function of the time index, n. (FIG. 6(b) shows a series of slices through the STV for various fixed values of x.).

FIG. 7 shows the relationship between the resulting slice through $x=x_0(n)$ and the facial image. FIG. 7(a) is the image at n =5 with the dotted-line through the mouth region corresponding to the vertical set of 64 pixels including $x_0(5)$. FIG. 7(b) shows the gray-scale sequential cue function that results by taking a similar set of pixel values for a set of sequential frames along the t-axis (n-index). The vertical centroid, $y_0(n)$, is shown center on the y-dimension of gray-scale image of FIG. 7(b). The dark region at approximately $y=y_0(n)$ represents the vertical opening of the mouth at $x_0(n)$. It is this information that is used to form a set of cues that may be used for speaker identification.

More specifically, the essential information to be extracted from the gray-scale sequential cue function of FIG. 7(b) are the identification cues represented by the triangular shaped dark areas. FIG. 8, an enlargement of FIG. 7(b), shows one of the cues highlighted by the triangle formed by the vertices A, B, and D. Point C is a spatiotemporal centroid $(t_0, y_0)$ known from the ROI detection performed by ROI mask unit 16. Line BA represents the locus of the upper extent of the mouth profile for the duration of the cue, while lines BD and DA jointly represent the locus of the lower extent of the mouth profile. In general, even though these loci do not follow straight lines, it has been found that this straight line approximation is adequate for the purpose.

The extraction of the identification cues from the gray-scale sequential cue function is performed by feature extraction unit 17. The first step is to segment the ST cues into rectangular cue-blocks with each cue-block enclosing only one cue by applying a gray-level transformation to each ROI as follows:

if $p(i,j) \geq G_{ST}$, then $q(i,j)=255$ else $q(i,j)=p(i,j)$ \qquad (6)

where $G_{ST}$ is an adaptively chosen threshold, $p(i,j)$ and $q(i,j)$ are the pixel values of the original ROI and transformed ROI, respectively, at n=i and y=j. Because the value of 255 correspond to maximum brightness, all values of $p(i,j)$ $\geq G_{ST}$ are made "white", while values less than $G_{ST}$ retain their original gray-scale values. FIG. 9 shows an example of one cue-block obtained with this procedure where the horizontal axis represents time and the vertical axis the y dimension. Each horizontal pixel interval is 1/30 seconds.

Each cue-block must contain a cue that is a collection of pixels that are continuous in the eight-neighbor sense, and at least three pixels wide. Because of the latter requirement, a cue must result from at least three successive frames (time-indices). An eight-neighbor neighborhood of pixel $p(j,k)$ is defined by the set of pixels $\{p(x+i,y+j)$ for $-1 \leq i \leq +1$, and $-1 \leq j < +1$. The threshold, $G_{ST}$, is adaptively determined from the histogram by using the following procedure.

FIG. 10 is a flow chart for the $G_{ST}$ procedure 100 that begins by setting histogram peak index, i=0. Step 101 acquires a gray-scale amplitude histogram (with zero corresponding to black) from a given spatiotemporal gray-scale sequential cue function. Step 102 determines sequential peak locations along the histogram's amplitude abscissa and assigns an index value i to the $i^{th}$ peak, $P_i$, where i=0, 1, 2. ...A trial threshold value, ($\tilde{G}_{ST}$, is set at $\tilde{G}_{ST}=P_i$ in step 103 and applied to the given gray-scale sequential cue function in step 104 by retaining all pixels with amplitudes equal to, or less than, $\tilde{G}_{ST}$. The number of cues, as previously defined, is counted in step 105 and set equal to $m_i$. Test step 106 checks if the value $m_i$ is less than the previous value, $m_{i-1}$, and, if not, proceeds to step 107 where index i is incremented and the process returns to step 103. Otherwise, the process goes to step 108 where the threshold value, $G_{ST}$, is made equal to $P_{i-1}$ and the process ends.

FIGS. 11 through 17 show the application of the adaptive procedure for determining $G_{ST}$ as described above. In FIGS. 11 and 13–16, a spatiotemporal gray-scale sequential cue function is shown at the left and the corresponding gray-scale histogram on the right. FIGS. 11 through 17 are for speaker (gw) and utterance (fa).

Figure 11A:
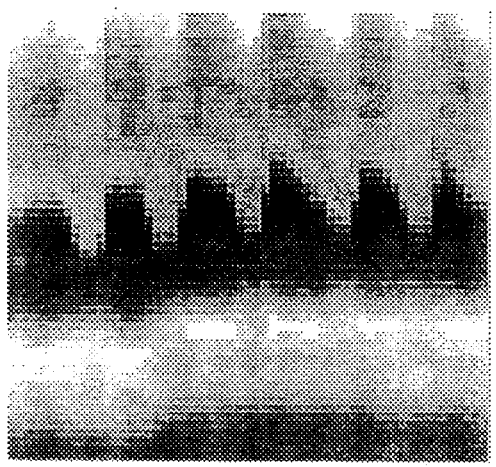
FIG. 11(a) is an example of a spatiotemporal gray-scale sequential cue function.
Figure 11B:
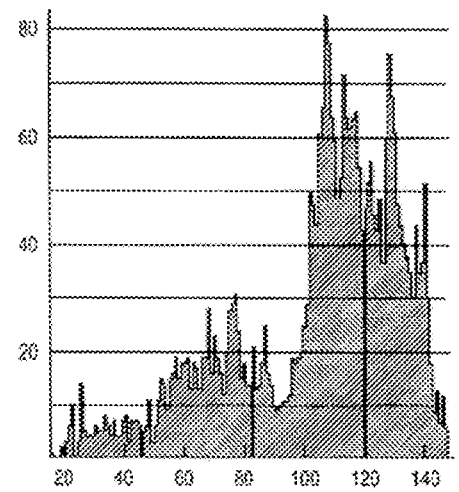
FIG. 11(b) is a histogram of the sequential cue function of FIG. 11(a).

FIG. 11 is for a non-thresholded gray-scale sequential queue function.

FIG. 12 is a table in which the first column corresponds to peak index, i; the second column corresponds to the histogram gray-level at which each indexed peak occurs; and the third column represents the number of cues obtained when $G_{ST}$ is set to each corresponding gray-level.

FIG. 13 shows the surviving features of the gray-scale sequential queue function when thresholded at $G_{ST}=19$, the first histogram peak. The accompanying histogram is shown with an expanded abscissa scale over the range of 15–61. The lighter gray shading of the histogram count indicates the levels indicated by $G_{ST}=19$. The surviving features do not satisfy the criteria for a cue.

FIG. 14 shows the results when $G_{ST}=23$, corresponding to i=2. The thresholded remnants of the gray-scale sequential queue function shows five isolated features of which the second and fifth satisfy the criterion for a cue.

FIG. 15 shows the results when $G_{ST}=53$, corresponding to i=10. Six thresholded remnants satisfy the criterion for a cue.

FIG. 16 shows the results when $G_{ST}=58$, corresponding to i=11. At this level of thresholding, the six cues seen in FIG. 15 are made contiguous, i.e., a cue count of one.

From the table of FIG. 12, it can be seen that for i=7 through 10, the cue count remains at 6 while at i=11 the separation of cues is eliminated. Consequently, the preferred threshold is $G_{ST}=53$, the highest threshold value that preserves the separation of cues.

FIG. 17 shows the thresholded remnants left-to-right and top-to-bottom for various threshold and cue counts represented by the doublet ($G_{ST}$,m).

If a threshold value is to be established for a single utterance, for example when an utterance is to be compared with a library of stored feature vectors, a threshold, $G_{ST}$, may be established using the same method, except that $G_{ST}$ is selected to correspond to the histogram peak value that produces a trial cue having the greatest number of pixels while preserving the characteristic triangular shape cue as shown in FIGS. 8 and 9. If this preferred threshold level is exceeded, the triangular model of FIG. 8 will be ill-suited and may lead to recognition errors. Alternatively, a set of cues based on a set of reasonable threshold values may be used to determine a set of feature vector components for use in the recognition mode.

Once the proper threshold, $G_{ST}$, is found, each cue may be isolated into distinct cue blocks.

Once the cue-blocks are obtained, estimates are made of the cue-width, cue-height, and mouth-opening-duration. These parameters are illustrated in FIG. 18 for two different scales of the mouth. Point B is the point before the utterance begins; point A, the point after the utterance ends; point D, the point of maximum expansion of the inner mouth area during an utterance; point E is the intersection of a perpendicular from the vertex D to line BA; and C is the centroid y-position ($y_0(n)$) for the value of time index, n, at which D occurred. Thus, C always lies on line CE. The distance CE is used to normalize the spatial measurements to compensate for perspective scaling of the image. If FIG. 18(b) is taken to represent the same speaker, speaking the same utterance as in FIG. 18(a), but at a greater distance, note that only the y-dimension (DE) is scaled because the time duration (BA) remains the same, i.e., it is invariant with respect to camera distance.

The quantities cue-width (BA), cue-height (DE), and mouth-opening duration (BE) are estimated in a cue-block having R rows and C columns with the lowest row and column index (1, 1) at the upper left corner as follows:

(1) BA—for each row, r, of the cue-block obtain the width, $w_r$, in pixel units, of the largest contiguous set of non-white (value 255) pixels, $$\{w\}=\{w_1 w_2, \ldots, w_r, \ldots, w_R\}, \qquad (7)$$

and set BA equal to $w_{max}=w_r$ that is greatest. If more than one row width is equal, define BA equal to the width at the highest row position (or lowest row index). The left most element of $w_{max}$ is point B and the right most element is point A.

(2) DE—for a cue-block with C columns obtain the height, h, in pixel units for the largest set of contiguous pixels $$\{h\}=\{h_1 h_2, \ldots, h_c, \ldots, h_C\} \qquad (8)$$

and reorder this set so that the elements are in increasing order of magnitude, i.e., $\{h'_1 \leq h'_2 \leq \ldots \leq h'_c\}$. Set DE equal to the largest element of the reordered set for which the row-width ($w_r$) is at least 2 pixel units wide. (This precaution minimizes the chances that a single noise spike is not selected as the cue-height.) If at this value of height, the row-width is an even number, M, then select pixel number M/2 in this row as the pixel corresponding to point D. If the row-width is an odd number, select the middle pixel to be point $D_1$.

(3) BE—the mouth-opening phase duration is equal to the number of temporal units difference in the coordinates of point B and D as determined by steps (1) and (2).

The following features are derived from the points A, B, C, D and E.

(1) MO—(mouth-opening speed)is the ratio of the normalized maximum lip-gap (DE), during an utterance to the time taken to reach that lip-gap value. Because the ratio of DE to CE remains constant and independent of camera to subject distance, the normalized lip-gap is equal to DE/CE.

The time to reach D from B is equal to BE measured in frame time units (1/30 sec.). Thus, $$MO=DE/(CE \cdot BE) \qquad (9)$$

(2) MC—(mouth-closing speed) is the ratio of the largest normalized lip-gap, DE/CE, to the time to reach the resting position of the lower lip. (EA), or $$MC=DE/(CE \cdot EA) \qquad (10)$$

where EA is measured in frame time units.

(3) STA—(spatiotemporal area of the frontal view of the oral cavity) is the area of the triangle defined by vertices B, D, and A, or $$STA=\tfrac{1}{2}(BA \cdot (DE/CE)) \qquad (11)$$

where BA is in frame time units.

By way of example, the cue-block of FIG. 9 will be used to derive the three features: MO, MC, and STA.

The cue-block is defined by a rectangular bounding box which includes all of the gray-scale shaded pixels shown. The top-left pixel is the first pixel of the first row and column. Each pixel has dimension of approximately 1 mm×(1/30) sec. In accordance with equation (7), $$\{w\}=\{1, 1,2,2,2,6,6,6,5,5,5,3,3,1\} \qquad (12)$$

Note that row 5 has two disparate contiguous sets of pixels, one 2 pixels wide and the other 1 pixel wide. Thus, $w_5=2$, the widest disparate contiguous set.

Because $w_6=w_7=w_8=6$, the row with the smallest row index (6) is defined to be the widest (6units of frame time) so that BA=6 or 6×1/30 seconds.

From equation (8), $$\{h\}=\{4, 6, 7, 8, 9, 8, 7\} \qquad (13)$$

Although $h_5=9$, at its minimum the $5^{th}$ column is only one row wide ($w_{14}=1$). Therefore, columns 4, 5, and 6 at row 13 and $w_{13}=3$ must be considered for establishing the maximum lower lip excursion (point D). Column 5, the central column of 4, 5, and 6 is selected and $h_5=8$ (not 9), so that DE=8. Because coordinates row 6, and column 2, defines point B, and row 13 and column 5 defines point D, the time interval BE=5−2=3 frame units.

If it is assumed that CE=1, then from equations (9), (1), and (11)

$$MO=DE/(CE \cdot BE)=8/(1 \cdot 4)=2$$

$$MC=DE/(CE \cdot EA)=8/(1 \cdot (6-4))=4$$

$$STA=\tfrac{1}{2}(BA \cdot (DE/CE))=\tfrac{1}{2}(6 \cdot (8/1))=24$$

where the units for MO and MC are 30 mm/second and the units for STA is (1/30) mm/second.

Experimental results have been obtained using four speakers each making five different utterances that resulted in the spatiotemporal (ST) slices of FIG. 19. Each row represents a different speaker (ds, es, $g_w$ and vp from top-to-bottom) and each column represents a different utterance (|ba|,|da|,|fa|,|la|,|ma| from left-to-right).

The detected cues using the gray-level transformation of equation (6) are shown in FIG. 20 for speaker ds. The first row is a repetition of the first row of FIG. 19, the second row shows the set of corresponding histograms from which the threshold value, $G_{ST}=40$, was determined and the third row shows the isolated cues that result from the gray-scale transformation.

FIGS. 21 shows the corresponding set of cues determined in similar fashion for speakers es, gw, and vp using $G_{ST}$ threshold values of 40, 50, and 30, respectively.

From these data, identification parameters MO, MC, and STA were calculated for each speaker and for each utterance. These parameters are plotted in FIG. 22, a 3-dimensional scatter plot in which values of STA are indicated by the size of the square plotted in the MO-MC plane. A speaker-dependent clustering of the features should be noted even when the distribution for two speakers (vp and $g_w$) have overlapping plots in the MO-MC plane, the two speakers can be distinguished by the distinctly different values of STA as represented by the size of square.

It is therefore concluded that the procedures outlined above and implemented as shown in FIG. 2 provide a set of, features, based on visual observation of utterances, that may be used for speaker identification either by themselves or in combination with other identifying observations. Thus, in FIG. 2, the output of feature extraction unit 17 corresponds to the set MO, MC and STA which may optionally be passed-on to comparator 18 for identification by comparing the vector with elements MO, MC, and STA with a set pre-stored exemplar vectors, or may be passed on to other apparatus for incorporation with other observational data.

It should also be noted that the normalization of distance DE of FIG. 18(a) and (b) may be expressed as $$DE/CE=(DC+CD)/CE=1+DC/CE \qquad (14)$$

so that the essential information is contained in the ratio DC/CE. This implies that an alternate normalization $$DE/DC=(DC+CE)/DC=1+CE/DC \qquad (15)$$

in which the essential information is contained in the ratio CE/DC, and is informationally equivalent to its reciprocal DC/CE. This observation further implies that either DC/CE or its reciprocal, is a suitable candidate element of a feature vector.

What is claimed is:

1. A computer-implemented method for generating a feature vector for use in a person recognition system, the feature vector based on visual observations of a spoken utterance, the computer-implemented method comprising the computer-implemented steps of:
   (a) observing a spoken utterance by a person that is to be recognized; and
   (b) representing the person's mouth action by a cue that includes a lip separation distance function of time that is associated with the spoken utterance;
   (c) extracting a set of feature vector components from the cue including,
      (i) duration of visual utterance beginning at the lip separation onset and ending at the lip separation closure;
      (ii) maximum lip separation distance and time of occurrence, and
      (iii) location of a mouth opening centroid between the mouth's upper and lower lip.

2. The method of claim 1 wherein the step of extracting a set of feature vector components from the cue includes an alternate set of feature vector components including,
   (i) a rate of lip separation opening from lip separation onset to when a maximum lip separation is reached,
   (ii) a rate of lip separation closing from the time of occurrence of the, maximum lip separation to when minimum lip separation is reached, and
   (iii) an area measure of the area under the lip separation distance function of time.

3. The method of claim 2 wherein the step of extracting the alternate set of feature vector components includes using normalized distances, the distances normalized by dividing by the distance from the centroid to the upper lip at the maximum lip separation time of occurrence.

4. The method of claim 2 wherein the extracting of the alternate set of feature vector components includes using normalized distances, the distances normalized by dividing by the distance from the centroid to the lower lip at the maximum lip separation time of occurrence.

5. The method of claim 1 wherein the maximum lip separation distance is normalized by dividing by the distance from the centroid to the upper lip at the maximum lip separation time of occurrence.

6. The method of claim 1 wherein the maximum lip separation distance is normalized by dividing by the distance from the centroid to the lower lip at the maximum lip separation time of occurrence.

7. The method of claim 1 wherein the observing a spoken utterance is by use of a sequence of video images of the person's face and further comprising extracting the person's mouth action from the sequence of video images by use of differenced video images produced by differencing sequential images, for identifying and selecting the person's mouth area while attenuating relatively motionless areas of the video images.

8. The method of claim 7 wherein the selecting the person's mouth area is by thresholding the differenced video images and selecting a contiguous mouth region where gray-scale values represent a large change between sequential images, the contiguous mouth region forming a mask for extracting the person's mouth area from the sequence of video images of the person's face and for calculating the centroid of the person's mouth area.

9. The method of claim 8 wherein the lip separation distance is measured on a line passing through the centroid and parallel to a person's line of frontal facial symmetry.

10. A method for generating a feature vector for use in a person recognition system, the feature vector based on visual observations of a spoken utterance, the method comprising:
   (a) acquiring a sequence of video facial images that are representative of the person speaking an utterance;
   (b) forming a sequence of difference images from the sequence of video facial images, each difference image representing an absolute difference in gray scale between succeeding video facial images for detecting changing facial areas associated with the spoken utterance, including the video facial image mouth area;
   (c) generating a mask function image that defines a large contiguous area representing the video facial image mouth area of each video facial image because the video facial image mouth area exhibits most change during an utterance, by thresholding each difference image;
   (d) establishing a region of interest (ROI) for each video facial image by centering the region of interest at each mask function image centroid and encompassing each video facial image mouth area;
   (e) sampling each ROI gray-scale along a line passing through each centroid location parallel to a line of left-to-right facial symmetry, and producing a sampled ROI gray scale function representative of gray-scale values along a line through the center of the mouth area;
   (f) forming a spatiotemporal function of time by ordering each sampled ROI gray-scale function in a sequential order corresponding to the sequence of video facial images from which they were obtained;
   (g) gray-scale transforming the spatiotemporal (ST) function, for producing a speaker utterance cue-block, by comparing the ST function gray-scale values with a selected threshold value for extracting the ST function areas with darkest gray-scale corresponding to lower-lip to upper-lip gray-scale; and
   (h) extracting a feature vector from the speaker's utterance cue-block by determining a duration of the utterance beginning with initial lip separation and ending with lip closure, maximum lip-to-lip opening distance and time of maximum lip-to-lip opening.

11. The method of claim 10 wherein the selected threshold value of step (g) is obtained by a method comprising:

(a) generating a histogram of gray-scale amplitudes of the ST function;

(b) locating a sequential set of histogram peaks and a set of associated gray-scale values from the histogram;

(c) thresholding the ST-function using a threshold value equal to each gray-scale value of the set of associated gray-scale values for producing a trial cue corresponding to each threshold value; and (d) selecting the threshold value that produces a trial cue with the greatest number of pixel elements while preserving a characteristic triangular-shaped trial cue.

12. The method of claim 10 wherein step (a) for acquiring a sequence of video facial images further comprises low pass filtering over time of the sequence of video facial images for reducing image noise.

13. The method of claim 10 wherein step (a) for acquiring a sequence of video facial images further comprises low pass spatial filtering for reducing image noise.

14. The method of claim 10 wherein step (a) for acquiring a sequence of video facial images further comprises low pass spatial and temporal filtering for reducing image noise.

15. The method of claim 10 wherein step (c) further comprises generating a threshold value for thresholding each difference image by using a gray-level histogram for establishing the threshold value for defining the large contiguous area representing the video facial image mouth area.

16. The method of claim 15 wherein the threshold value is set to approximately equal to the gray-level histogram most central minimum value.

17. The method of claim 10, wherein the selected threshold value of step (g) is determined by generating a gray-level histogram from the ST function and selecting a threshold value that preserves a contiguous ST region corresponding to lower-lip to upper-lip gray-scale.

18. The method of claim 10 wherein step (h) for extracting a feature vector further comprises normalizing the maximum lip-to-lip opening distance by dividing by a distance value representing the centroid to upper-lip distance, the centroid location corresponding to that used in step (d).

19. The method of claim 10 wherein step (h) for extracting a feature vector further comprises normalizing the maximum lip-to-lip opening distance by a distance value representing the centroid to lower-lip distance, the centroid location corresponding to that used in step (d).

20. The method of claim 10 wherein step (h) for extracting a feature vector comprises determining a mouth opening speed from initial lip separation to maximum lip separation, mouth closing speed from maximum lip opening to lip closure, and an approximate spatiotemporal area value representative of an area enclosed by the upper-lip and lower-lip (and representative of the frontal area of the oral cavity) over a duration of utterance beginning with initial lip separation and ending with lip closure.

21. The method of claim 20 wherein the mouth opening speed the mouth closing speed and the approximate spatiotemporal area are normalized by dividing each by a centroid to upper-lip distance.

22. The method of claim 20 wherein the mouth opening speed, the mouth closing speed, and the approximate spatiotemporal area of the frontal view of the oral cavity are normalized by dividing each by a centroid to lower-lip distance.

23. The method of claim 10 wherein step (h) for extracting a feature vector comprises determining a mouth opening speed from initial lip separation to maximum lip separation, the mouth closing speed from maximum lip opening to lip closure, and a ratio value representing a ratio of centroid to upper lip location distance to lower lip to centroid location distance at maximum lip separation.

24. The method of claim 23, wherein the ratio value represents a ratio of lower lip to centroid distance to upper lip to centroid distance of maximum lip separation.

25. The method of claim 23 wherein the step of the system observing the spoken utterance comprises acquiring a sequence of video facial images representative of the person providing the spoken utterance.

26. The method of claim 25 further comprising forming difference images from the sequence of video facial images to detect changing facial areas associated with the spoken utterance.

27. The method of claim 1 wherein the step of observing is performed using a camera in the computer system and the step of extracting is performed using at least one filter.

28. A system-implemented method for performing recognition, comprising the system-implemented steps of:

(a) visually observing a spoken utterance by a person that is to be recognized by use of a sequence of video images of the person's face;

(b) extracting the person's mouth action from the sequence of video images by use of differenced video images produced by differencing sequential images;

(c) detecting the person's mouth opening by thresholding the differenced video images and selecting a contiguous mouth region where gray-scale values represent a large change between sequential images, the contiguous mouth region forming a mask for extracting the person's mouth area from the sequence of video images;

(d) locating the person's mouth area by calculating a centroid of the mouth area;

(e) extracting a feature vector from the spoken utterance by determining a duration of the spoken utterance beginning at the lip separation onset and ending at the lip separation closure, lip-to-lip opening distance, and time of such a lip-to-lip opening; and (f) performing recognition by comparing the feature vector with a predetermined set of feature vectors.

\* \* \* \* \*